United States Patent [19] [11] Patent Number: 5,013,976
Butler [45] Date of Patent: May 7, 1991

[54] ELECTRODELESS GLOW DISCHARGE LAMP

[75] Inventor: Scott J. Butler, Auburn, Mass.

[73] Assignee: GTE Products Corporation, Danvers, Mass.

[21] Appl. No.: 456,715

[22] Filed: Dec. 26, 1989

[51] Int. Cl.⁵ ............................................. H05B 41/24
[52] U.S. Cl. ......................................... 315/248; 315/39
[58] Field of Search ............... 315/248, 39, 56, 246, 315/344, 55, 150; 313/44; 333/24 C

[56] References Cited

U.S. PATENT DOCUMENTS

| | | | |
|---|---|---|---|
| 3,763,392 | 10/1973 | Hollister | 315/248 |
| 3,942,058 | 3/1976 | Haugsjaa et al. | 313/44 |
| 3,943,401 | 3/1976 | Haugsjaa et al. | 315/39 |
| 4,001,631 | 1/1977 | McNeill et al. | 315/39 |
| 4,001,632 | 1/1977 | Haugsjaa et al. | 315/39 |
| 4,002,943 | 1/1977 | Regan et al. | 315/39 |
| 4,002,944 | 1/1977 | McNeill et al. | 315/39 |
| 4,041,352 | 8/1977 | McNeill et al. | 315/248 |
| 4,063,132 | 12/1977 | Proud et al. | 315/248 |
| 4,189,661 | 2/1980 | Haugsjaa et al. | 315/39 |
| 4,266,166 | 5/1981 | Proud et al. | 315/248 |
| 4,266,167 | 5/1981 | Proud et al. | 315/248 |
| 4,427,921 | 1/1984 | Proud et al. | 315/248 |
| 4,427,923 | 1/1984 | Proud et al. | 315/248 |
| 4,812,702 | 3/1989 | Anderson | 313/153 |

Primary Examiner—Eugene R. LaRoche
Assistant Examiner—Ali Neyzari
Attorney, Agent, or Firm—William E. Meyer

[57] ABSTRACT

A re-entrant radio frequency cavity geometry for a low-pressure microwave electrodeless lamp such as a compact fluorescent lamp is described. The re-entrant cavity makes use of the properties of a re-entrant coaxial cavity resonator. The electrodeless lamp may be fabricated to have a constant input impedance in both the on and off states. In addition, the lamp starts at a lower drive power than present high efficacy, compact fluorescent lamps.

21 Claims, 4 Drawing Sheets

PRIOR ART

ELECTRODELESS GLOW DISCHARGE LAMP

1. TECHNICAL FIELD

The invention relates to electric lamps and particularly to glow discharge electric lamps. More particularly the invention is concerned with electrodeless glow discharge lamps.

2. BACKGROUND ART

For incandescent lamps, energy is expended in bringing the filament up to its operating temperature The energy supplied to the filament is converted into visible light (short wave radiation) and heat (long wave radiation). The majority of the energy is emitted as heat. Filamented lamps then are necessarily inefficient producers of visible light.

Typical metal halide lamps for commercial lighting produce from 80 to 100 lumens per watt. Even at powers as low as 30 watts, the efficiency can be greater than 50 lumens per watt.

The advantages of an efficient source extend beyond reduced energy consumption. With less heat being generated low cost materials, and assemblies may be used to form the reflectors and lens for the lamps. Smaller, more compact devices are more easily integrated into difficult design conditions, such as those for an aerodynamic lamp.

Figure 1:
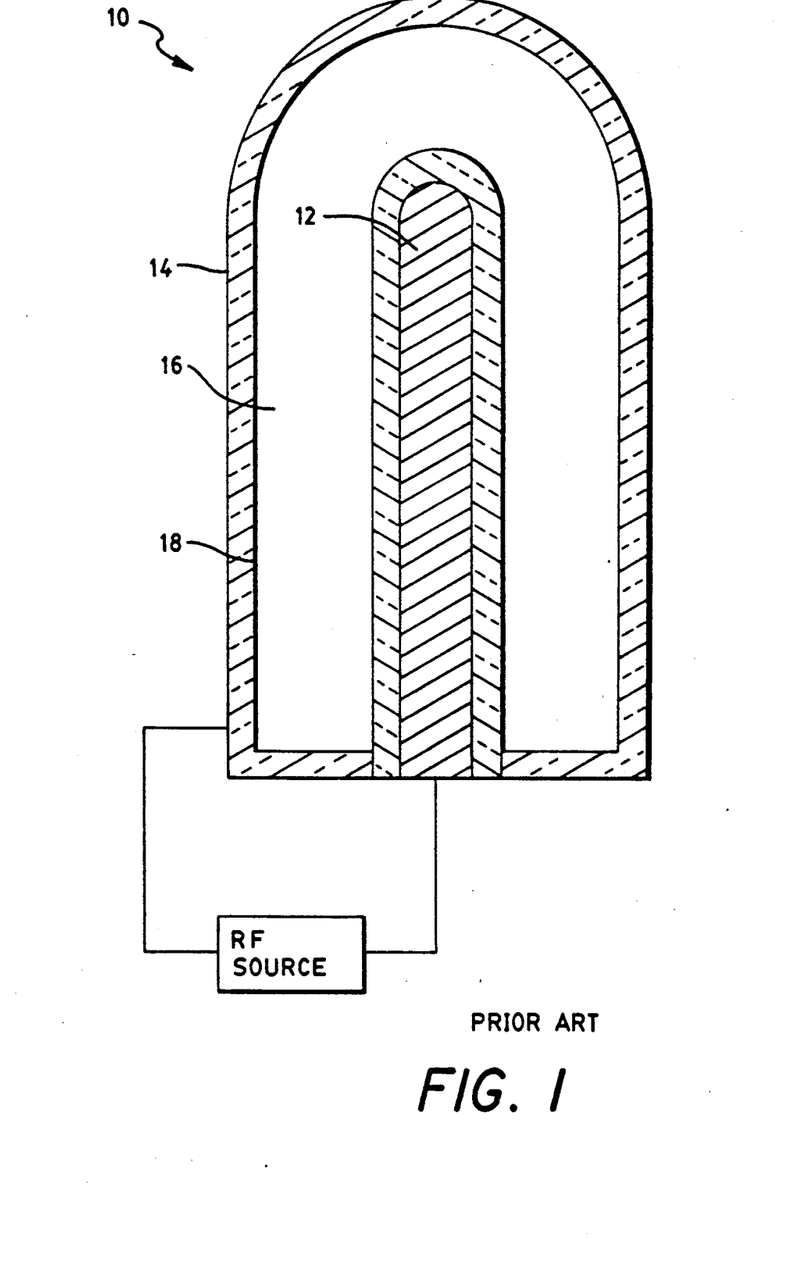
FIG. 1 shows a schematic diagram of prior art example of an electrodeless microwave lamp.

FIG. 1 shows a cross section of a conventional low pressure electrodeless lamp 10 as known in the prior art. A coupling probe 12 in the form of a rod having an input end and a radiant end is positioned axially in a cylindrical outer conductor 14. Intermediate, and possibly at the axial ends of the center and outer conductors is a volume of gas 16 contained in a transmissive envelope 18, such as a glass envelope. When a radio frequency signal is applied between the coupling probe and the outer conductor, the enclosed gas 16 can be caused to radiate visible, or ultraviolet light. In the later case, the glass envelope may be phosphor coated to generate visible light in the same fashion as a fluorescent lamp. Presently, electrodeless lamps in demonstration are capable of efficiencies of about 110 lumens per watt for an input of about 10 to 20 watts of radio frequency power.

One application of an electrodeless lamp is as a replacement for a standard incandescent lamp. To fabricate a compatible replacement lamp, a suitable power source is needed to convert the alternating current line power to microwave power. If a solid-state power source is used, a serious potential problem may occur in interfacing the lamp with the power source. Since present low-pressure electrodeless lamps require approximately 10 watts of incident power to start, the solid state power source must be capable of delivering a power wave of 10 watts to the off state impedance of the lamp. This power requirement is true even if the starting power wave is the result of multiple reflections. There is then a need for an electrodeless lamp with a low impedance for starting.

Since the off state impedance of existing low-pressure electrodeless lamps is approximately a pure reactance, the power source is required to deliver power to the lamp load with an infinite voltage standing wave ratio (VSWR) unless a buffer, such as an attenuator or ferrite isolator is inserted between the power source and the load. Once the lamp starts, the gas is excited and conducts, with the result that the lamp impedance drops dramatically. The demand for an infinite VSWR for starting followed by a normal or low impedance means the power source must be able to withstand the large impedance mismatch, while providing high output power. The conventional electrodeless lamp design then results conflicting needs for high power and large impedance mismatch, which is conventionally resolved by designing an expensive power supply. There is then a need to for an electrodeless lamp that has low starting impedance, and good impedance matching at full power.

Examples of the prior art are shown in U.S. Pat. Nos. 3,763,392; 3,942,058; 3,943,401; 4,001,631; 4,001,632; 4,002,943; 4,002,944; 4,041,352; 4,063,132; 4,266,166; 4,266,167; 4,427,921; 4,189,661; 4,427,923; and 4,812,702.

U.S. Pat. No. 3,763,392 Hollister broadly shows a light transmissive sphere containing a high pressure gas that is induced to radiate by an induction coil surrounding the sphere.

U.S. Pat. No. 3,942,058 Haugsjaa shows an electrodeless lamp with means for controlling the discharge to prevent attachment to the envelope.

U.S. Pat. No. 3,943,401 Haugsjaa shows an electrodeless lamp with means for moving a conductor to thereby alter the impedance of the lamp between starting and operating states.

U.S. Pat. No. 4,001,631 McNeill shows an electrodeless lamp with means for adjusting the axial penetration of the inner conductor to thereby alter the impedance of the lamp between starting and operating states.

U.S. Pat. No. 4,001,632 Haugsjaa shows an electrodeless lamp with a network means for impedance matching.

U.S. Pat. No. 4,266,166 Proud shows an electrodeless compact fluorescent lamp with a pear shaped envelope described as being a re-entrant cavity. The cavity is considered a re-entrant gas cavity, but not an electrically resonant cavity. This particular patent is considered a good reference of the technology in general and the discussion therein is hereby included by reference.

U.S. Pat. No. 4,427,921 Proud shows an electrodeless ultraviolet light source with a pear shaped cavity denoted as a re-entrant cavity. The cavity is considered a re-entrant gas cavity, but not an electrically resonant cavity.

U.S. Pat. No. 4,189,661 Haugsjaa for Electrodeless Fluorescent Light Source shows a lamp with an outer conductor that is tubular, with and inner rod shaped probe. The gas containment cavity is shown as a cup like structure. The cavity is described as being re-entrant. The cavity is considered a re-entrant gas cavity, but not an electrically resonant cavity.

U.S. Pat. No. 4,002,943 Regan shows an electrodeless lamp with an adjustable microwave cavity. The cavity is designed to be expandable or contractible by threading two wall portions together.

U.S. Pat. No. 4,002,944 McNeill discloses an electrodeless lamp using a resonant cavity to contain the lamp capsule. A tuning element is inserted in the cavity to adjust the cavity resonance.

U.S. Pat. No. 4,041,352 McNeill shows an electrodeless lamp with an included capacitor to assist in lamp starting. On ignition, a switch disconnects the capacitor, allowing full power to flow to the discharge gas.

U.S. Pat. No. 4,063,132 Proud shows an electrodeless lamp with a means for rapidly, and repetitively charging the lamp electrodes.

U.S. Pat. No. 4,427,923 Proud shows an internal electrodeless lamp for radiating ultraviolet light in combination with an exterior envelope with a fluorescent coating material to transform the ultraviolet light to visible light.

U.S. Pat. No. 4,812,702 Anderson discloses a toroidal coil for inducing a toroidal discharge in a containment vessel. Anderson emphasizes the use of a V shaped torus cross section.

DISCLOSURE OF THE INVENTION

An electrodeless lamp to receive power from a radio frequency power source, may be formed with a conductive coupling probe having an axial extension from an input end to a radiant end, a conductive outer conductor surrounding and offset from the coupling probe having at least a portion formed from a light transmissive, electrically conductive structure. The outer conductor further having a sheath portion surrounding, and separated from the axial extension of the probe by a radial electrode gap, and a vessel portion surrounding the radiant end of the probe defining a re-entrant cavity around the radiant end, and having a cap axially separated from the radiant end by an axial electrode gap.

BEST MODE FOR CARRYING OUT THE INVENTION

Figure 2:
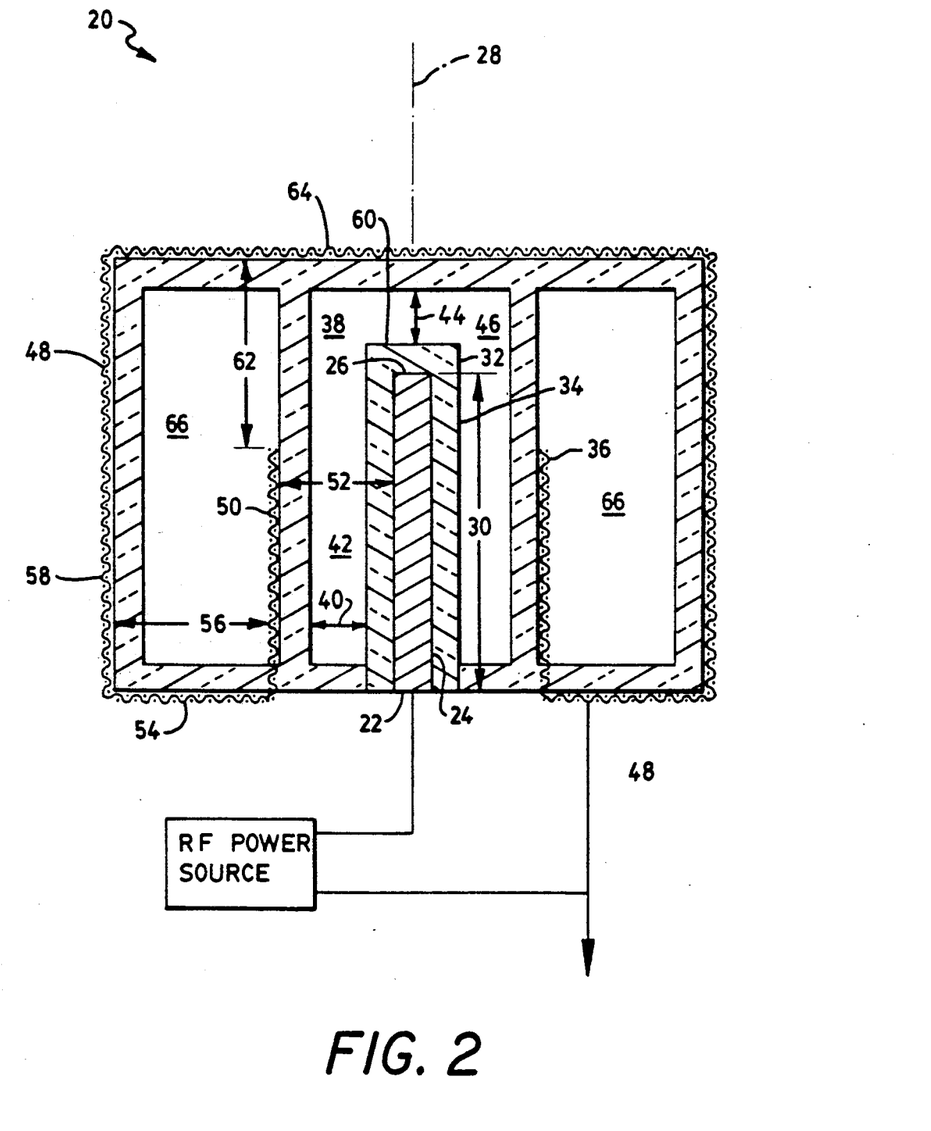
FIG. 2 shows a cross sectional view of a preferred embodiment of a microwave lamp with a re-entrant cavity.

FIG. 2 shows a cross section of a preferred embodiment of an electrodeless lamp 20 with a re-entrant cavity. A coupling probe 22 in the form of a cylindrical rod having an input end 24 and a radiant end 26 provides a center conductor positioned along an axis 28 with an axial extension 30. It is not crucial to the overall lamp operation that an exact multiple of quarter wave lengths be used, nonetheless in the preferred embodiment, the probe 22 has an axial extension 30 that is approximately one quarter the wavelength of the applied radio frequency oscillations.

The coupling probe 22 is positioned axially in a gas containment vessel 32. In the preferred embodiment the containment vessel 32 has the form of a closed end inner tube 34, and a closed end outer tube 36 coupled to enclose a volume 38 of a gas excitable by radio frequency power. In the preferred embodiment, the probe 22 is closely enclosed by the inner tube 34 tube. The probe 22 and closed end inner tube 34 are then surrounded by the closed end outer tube 36. The inner tube 34 is radially separated from the outer tube 36 by a radial gas gap 40 thereby defining a radial cavity region 42. The inner tube 34 is also axially separated from the closed end of the outer tube 36 by an axial gas gap 44 thereby defining a gap cavity region 46. The inner tube 34 and outer tube 36 sections are otherwise sealed to enclose the volume 38 of gas chosen for its excitation characteristics as is known in the art. The gas containment vessel 32 is formed from an electrically nonconductive material that allows the transmission of radiant energy such as visible or ultraviolet light. The preferred materials for the gas containment vessel 32 are glass and fused quartz.

The gas containment vessel 32 is axially surrounded by an outer conductor 48. The outer conductor 48 includes an sheath 50 disposed around and generally coaxial with the coupling probe 22, the length of the inner tube 34 and the length of the outer tube 36. In the preferred embodiment, the sheath 50 is cylindrical, coaxial with, but offset from the coupling probe 22 by a radial electrode gap 52 sufficient to enclose the containment vessel 32. Starting near the input end 24, the sheath 50 extends coaxially toward the radiant end 26, but in the preferred embodiment, extends axially less far than does the probe 22, thereby leaving a portion of the radiant end 26 exposed with respect to the sheath 50. During lamp operation, the gas in the containment vessel 32 is excited to glow. It is convenient that some or all of the sheath 50 be formed to allow transmission of the generated light to the outside. The sheath 50 may then be formed from a wire mesh having a mesh gap much less than the wave length of the incident power.

In the preferred embodiment, the sheath 50 is electrically coupled to a conductive, radial connector 54. The sheath 50 may be connected anywhere along its axial extent to the radial connector 54. The radial connector 54 extends for a distance of an outer spacing 56. The radial connector 54 in turn couples to an outer wall 58 that defines and encloses a re-entrant cavity surrounding the radiant end 26. The outer spacing 56 is suggested to be sufficiently large to radially offset the outer wall 58 from the radiant end 26 by more than the axial electrode gap separation 64, and preferably by more than twice the axial electrode gap separation 64.

The outer wall 58 couples with a lamp cap 60 that extends transverse to the coupling probe 22 and sheath 50 to act as an electrical cap for the axial end of the containment vessel 32. The radial connector 54, the outer wall 58 and lamp cap 60 portions of the outer connector 48 then act as a vessel to enclose a re-entrant cavity 66 around the radiant end 26.

Opposite, and coaxial with the radiant end 26 is the lamp cap 60 portion of the outer conductor 48. Along the length of the outer conductor 48, after the sheath 50, the lamp cap 60 comes closest to the radiant end 26, being separated from the radiant end 26 by an axial electrode gap separation 64 that is larger than the radial electrode gap separation 52. An axial sheath gap 62 is also formed in the re-entrant formation between the axial end of the sheath 50 and the nearby lamp cap 60. Similarly, an axial electrode gap 64 exists between the radiant end 26 and the lamp cap 60. The radial electrode gap 52 should be less than or equal to the axial electrode gap 64. The sheath gap 62 should be greater than the axial electrode gap 64, and preferably two or more times larger. The particular ratios of the sheath 50 length to the lamp cap 60 length determine in part the impedance characteristics of the re-entrant cavity 66, as may be adapted from microwave theory, provided the re-entrant cavity as defined by the outer wall 58 is otherwise offset from the probe 22 by a distance greater than the axial electrode gap 64 between the probe 22 and the lamp cap 60. Preferably, the offset should be two or more times the axial electrode gap 64. The volume of the re-entrant cavity 66 should be larger than the axial electrode gap volume defined by the axial region between the radiant end 26 and the lamp cap 60. Preferably, the re-entrant volume 66 is ten or more times greater than the axial electrode gap volume. The impedance of the lamp may be adjusted by varying the axial position of the coupling probe 22 in the re-entrant cavity. In short, the lamp may be tuned by adjusting the gap 64.

The axial electrode gap cavity region, in terms of electromagnetic radiation, then extends transversely to the probe axis 28 into an expanded volume defined by the outer conductor 48. The expanded volume comprises an electrically resonant, re-entrant cavity 66. The preferred re-entrant cavity 66 is radially symmetric with respect to the probe axis 28. The preferred re-entrant cavity 66 extends two or more times the axial electrode gap separation 64 radially away from the probe axis 28. The cavity preferably further includes an internal distance parallel with the probe axis 28 for two or more times the axial electrode gap separation 64. The re-entrant cavity 66 may be evacuated or may be filled with a dielectric. The re-entrant cavity 66 may be filled with a dielectric, thereby allowing the cavity volume to be reduced. The purpose of the re-entrant cavity is to allow radiant energy to freely spill out of the axial electrode gap cavity region, but to thereafter be reflected back into the axial electrode gap cavity region by enclosing the spill region. The starting impedance is then small, but the power input is not lost but returned to the start up region between the radiant end 26 and lamp cap 60. The re-entrant cavity 66 helps minimize the starting requirements, and provide a manageable impedance level during lamp starting.

In one embodiment, FIG. 2, the sheath 50 couples to a radial extension 52 near the input end 24 that extends radially to the outer wall 58. The outer wall 58 doubles back over the sheath 50 as an outer sheath, and extends coaxially with the coupling probe 22 and sheath 50 beyond the axial ends of the coupling probe 22 and sheath 50. The axial end of the outer wall 58 is closed transversely to the axis and includes a lamp cap 60 portion axially offset from the radiant end 26, and adjacent the closed end of the outer tube 36. The lamp cap 60 is the nearest portion of the outer wall 58 to the radiant end 26. The outer conductor 48 then has the general form of a sheath portion (50) that surrounds the probe, and a re-entrant vessel portion (54, 58, 60) that defines a cavity that extends radially from the gap cavity region 46 adjacent the radiant end 26, but also has a lamp cap 60 portion that closes the axial region opposite the radiant end 26. The sheath 50 and vessel (54, 58, 60) portions are electrically connected and define a closed surface around the probe 22 with respect to the radio frequency radiation. The whole of the outer conductor 48 is formed from a mesh or similar light transmissive, electrically conductive structure. A re-entrant volume 66 is then formed around the gap cavity region 46. Although the portrayed walls are parallel, or at right angles to one another, the radial connector 54, outer wall 58, and lamp cap 60 walls may be arced, or otherwise at angles to each other. The cylindrical form is felt to be the easiest to manufacture, but toroidal or other shapes may be used.

Figure 3:
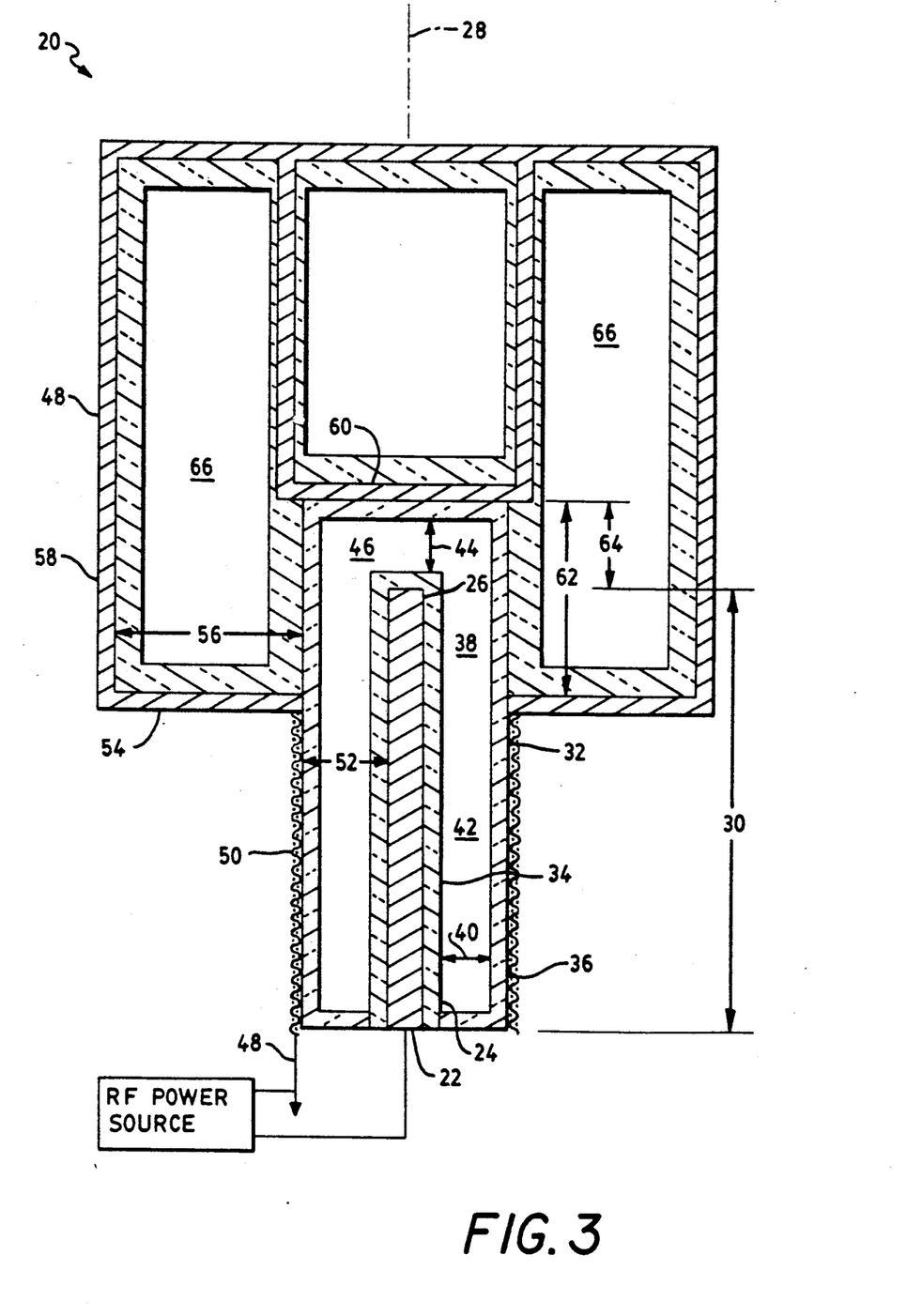
FIG. 3 shows a cross sectional view of an alternative preferred embodiment of a microwave lamp with a re-entrant cavity.

In an alternative embodiment, FIG. 3, the sheath 50 is connected to a radial connection 54 near the radiant end 26. The radial connection 54 extends radially to an outer wall 58 that encloses and defines a re-entrant cavity 66 about the radiant end 26. A portion of the outer wall 58 approaches the radiant end 26, adjacent the outer tube 36 end to form a lamp cap 60, and define an axial electrode gap 64. In FIG. 3, only the sheath 50 is formed from a light transmissive, electrically conductive structure.

Light is generated in both the radial cavity region 42 and the gap cavity region 46 on application of radio frequency power. It is therefore, preferable that some or all of the sheath 50, radial connector 54, outer wall 58, and lamp cap 60 surrounding the containment vessel be light transmissive, or designed with reflective surfaces to pass light to light transmissive sections. Any portion of the sheath 50, radial connector 54, outer wall 58 or lamp cap 60 may be formed from a conductive mesh. A substantial portion of the containment vessel 32 may then be exposed for light transmission. The mesh conductor may be formed with numerous holes, either as a woven structure having a web of conductive material with gaps formed between the web wires, or as in the preferred embodiment, as a sheet with numerous holes formed in a regular pattern. The mesh may be formed to be self supporting, or may be supported by an adjacent, light transmissive, nonconductive support such as a glass wall. The gaps, or holes formed in the conductor should be much less than a quarter wavelength of the radio frequency chosen to operate the lamp. For a frequency of $10^9$ to $10^{11}$ Hertz, the gap opening should then be much less than 7.5 cm to 0.75 mm respectively. For an input frequency of $5 \times 10^{10}$ Hertz, a gap hole of about 1.0 mm would be appropriate. Since solid portions of the mesh block the passage of light, it is generally better to select a low frequency power source to allow a more open mesh and therefore relatively more light transmission. Conversely, ignition occurs more readily at higher frequencies. The choice of an operating frequency is then balanced between the needs for ignition and operation as against the amount of light blocked by the chosen mesh size. Alternatively, for reasons of mechanical strength or electrical conduction, any portion of the sheath 50, radial connector 54, outer wall 58 or lamp cap 60 may be formed from continuously linked, conductive material.

Formed intermediate the coupling probe 22 and the sheath 50 is the radial cavity region 42. Formed between the radial extension 54, the outer wall 58, and the lamp cap 60 is a re-entrant volume 66. Since the end of the sheath 50 is offset from the lamp cap 60 to leave the axial sheath gap 62, the inner gap cavity region 46 then, in terms of radio frequency radiation, extends to the re-entrant volume 66.

Intermediate, or at the axial ends of the coupling probe 22 and outer conductor 48 is a volume of fill gas 38 in the containment vessel 38. Numerous fill gases may be used, and in general the fill composition is similar to, if not the same as the fill composition in conventional compact fluorescent lamp. When a radio frequency signal, as may be generated by known means, is applied between the coupling probe 22 and the outer conductor 48, the enclosed gas 38 can be caused to radiate visible light, or ultraviolet light. The light generated by the electric field excited enclosed gas exits from the enclosed volume by passing through the gaps in the mesh. When ultraviolet light is generated, the containment vessel 32 may be phosphor coated to generate visible light in the same fashion as a fluorescent lamp. The phosphor is usually positioned on a surface not exposed to the excited gas. The radio frequency signal does not pass through the mesh conductors, since the mesh openings are much less than a quarter wavelength of the radio frequency signal.

The re-entrant cavity design provides an electrodeless lamp with nearly constant impedance for both starting and operation. The radio frequency power source is then easily impedance matched to the lamp.

Figure 4:
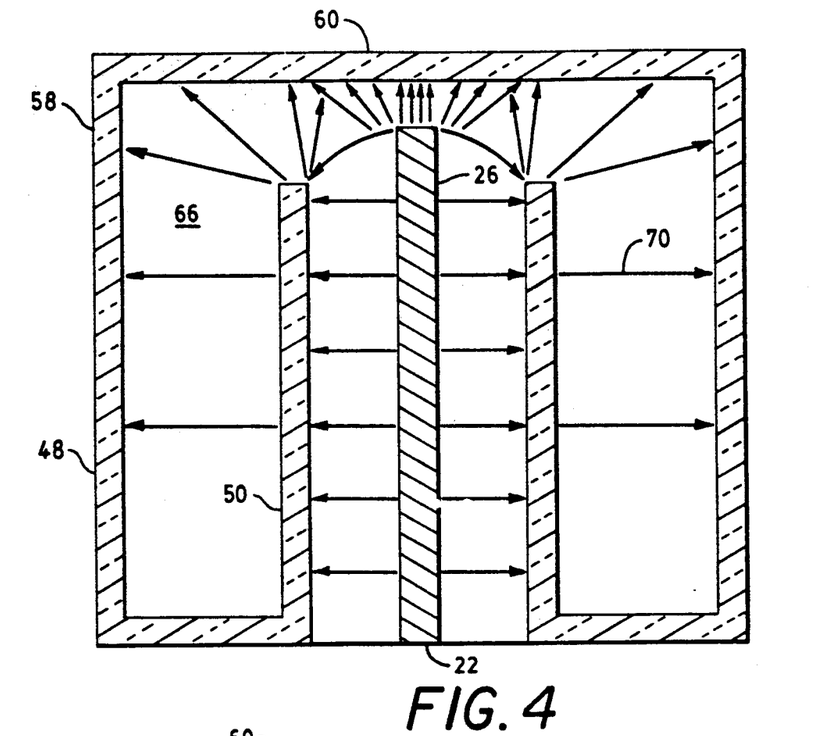
FIG. 4 shows a cross sectional view of a preferred embodiment of a microwave lamp with a re-entrant cavity indicating electric field lines during start up operation.

FIG. 4 shows a preferred embodiment of a microwave lamp with a re-entrant cavity indicating electric field lines 70 as they might appear during start up operation. The re-entrant coaxial cavity 66 with the coupling probe 22 at a voltage anti-node. Field lines 70 are shown to extend from the radiant end 26 of the coupling probe 22 radially to the lamp cap 60 to approximately the radial limit of the sheath 50. Field lines are further shown extending from the radiant end 26 of the sheath 50 to the lamp cap 60, and then in rotation, and finally transversely across to the outer wall 58.

Figure 5:
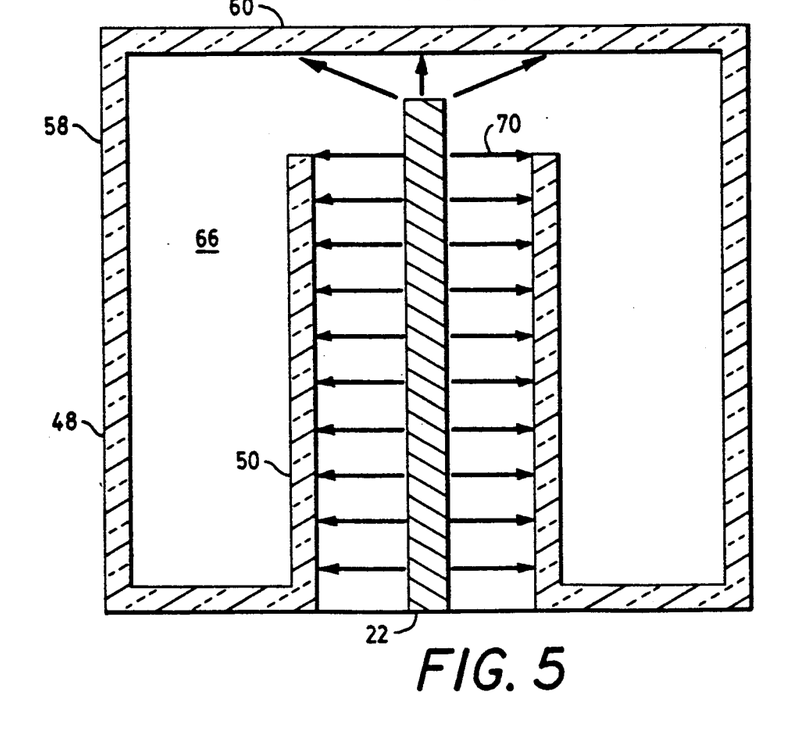
FIG. 5 shows a cross sectional view of a preferred embodiment of a microwave lamp with a re-entrant cavity indicating electric field lines during full power operation.

FIG. 5 shows a preferred embodiment of a microwave lamp with a re-entrant cavity 66 indicating electric field lines 70 during full power operation as they might appear in the re-entrant coaxial cavity. The field is reduced in the re-entrant cavity 66, since the containment vessel 32 holds the discharge gas.

The lamp operation and the unique features of the lamp can be better understood by examining the impedance and field line geometry characteristics in both the on state and off state of the lamp. In the off state or start up stages, the lamp is essentially a re-entrant coaxial cavity with a coupling probe 22 located at a voltage anti-node. FIG. 4 illustrates the representative electric field lines for the lamp during off state or start up stages of operation. The use of a coupling probe 22 at a voltage anti-node in a microwave cavity has been generally avoided because of the likelihood of voltage breakdown. However, use of a coupling probe 22 at a voltage anti-node in a microwave cavity is useful in an electrodeless lamp to help reduce the power required to start the lamp. The coupling probe 22 and the inner cavity 50 can be viewed as an admittance inverter and a resonant circuit. Since the inner radial cavity region 42 must exhibit a finite ratio of stored energy to dissipated energy, Q, and therefore presents a real impedance at resonance, the admittance inverter may transform the real cavity impedance at resonance to a different real impedance. If the re-entrant cavity 66 terminates a transmission line with a characteristic impedance of $R_0$, three different impedance conditions may exist, depending on the coupling. The input impedance may be transformed via the admittance inverter to a value $R_{IN}$ such that, $R_{IN} > R_0$ (overcoupled case)

$R_{IN} < R_0$ (undercoupled case)

$R_{IN} = R_0$ (critically coupled case).

As a result, by varying the axial penetration of the coupling probe 22 in the cavity formed by the sheath 50, the radial connector 54, the outer wall 58 and the lamp cap 60, critical coupling may be achieved. At critical coupling, the steady state cavity response of the lamp circuit elements is the same as for a matched load. The cavity impedance during start up operation is then matched perfectly, and maximum power may be transferred from a matched power source to the cavity resulting in a high electric field. The high electric field condition then initiates discharge in the radiant gas contained in the inner cavity 50, and re-entrant cavity 66. The lamp in the off state may then be started with a minimal power input, and operated with approximately 10 to 20 watts.

On starting, the discharge is contained in the inner volume 42 of the lamp. The resistance of the enclosed gas falls with increasing temperature, resulting in a changing lamp impedance. Therefore, operation in the on state is analogous to a conventional low pressure lamp, as shown for example in a compact fluorescent lamp. The coupling probe 22 of the re-entrant cavity 66 serves as the inner conductor of the lamp, and the sheath 50 serves as the outer wall 58 as in a conventional electrodeless lamp. The radial cavity region 42 immediately adjacent the coupling probe 22 then acts conventionally in starting the lamp.

The reduced starting power requirement for the re-entrant cavity lamp is illustrated in the following example of an arbitrarily selected 915 MHz re-entrant coaxial cavity, geometrically corresponding to the one shown in FIG. 2. For simplicity, solid copper walls are assumed in the calculations. In an actual lamp, mesh wall are used, so the light generated may pass through the mesh to the exterior.

The unloaded Q of the cavity in transverse electromagnetic mode, (915 MHz) is given by:

$$1/Q = k\delta \frac{1 + \cos^2(kh)}{kh + \sin(kh)\cos(kh)} + \frac{1}{2\ln(b/a)}(1/ka + 1/kb)$$

where, $k = 2\pi/\lambda_0$
and $\delta = \sqrt{(2/\omega\mu\sigma)}$ (skin depth)
Thus, for the assumption of solid copper walls:

$Q \approx 6.83 \times 10^3$

The equivalent conductance of the cavity gap is given by:

$$G = \pi\kappa\delta \sqrt{(\epsilon_0/\mu_0)} \frac{1 + \cos^2(kh)}{\sin^2(kh)(\ln(a/b))} + \frac{1}{2(\ln(a/b))^2}$$
$$(1/ka + 1/kb) * (kh/\sin^2(kh) + 1/\tan(kh))$$

Thus, $G \approx 3.13 \times 10^{-6}$ S.

Therefore, the equivalent shunt resistance of the re-entrant cavity at resonance is given by:

$R \approx 1/G \approx 3.2 \times 10^5 \Omega$ which may be transformed to a 50 ohm input impedance via the coupling probe.

Since the conventional reduced field (E/p)s at starting for a low pressure electrodeless lamp is approximately 5 volts per centimeter Torr, if a pressure of 6 Torr is assumed, and since the gap in the calculation example is approximately 1.09 cm:

$\sqrt{PR} = (E/p)s$ (Pressure)(gap length)

$\sqrt{PR} = (5)(6)(1.09)$ $PR = 1.06 \times 10^3$ $P \approx 3.34$ mW

The power required to start the lamp is therefore only about 3.34 mW. Even if the constraints of building an inexpensive lamp with practical construction techniques degrades the computed figure by two orders of magnitude, the starting power would still be only about three percent (3.0%) of the starting power presently required for conventional low pressure electrodeless lamps. A power requirement variation of about three percent is easily achievable by conventional power sources.

As a calculation example, a lamp for a 915 MHz re-entrant coaxial cavity might have approximately the following dimensions: The outer radius may be 4.17 cm. The inner radius may be 2.09 cm. The axial extension of the sheath may be 5.17 cm. The axial extension of the outer wall may be 6.26 cm. The gap between the axial limit of the sheath and the face piece may be 1.09 cm. Since the resonant characteristic of the cavity is dependent on the particular applied frequency, materials used and specific dimensions, the coupling probe length has an axial extension that is best determined by adjusting the probe length during operation to locate the lowest impedance. The coupling probe may have a diameter of 1.09 cm. The actual dimensions are quite variable, since many forms may be used. The starting impedance is then calculated to be about 50 ohms. The operating impedance is similarly calculated to be about 50 ohms. The power source would then not be required to endure large impedance variations between lamp start up and lamp operation. The disclosed dimensions, configurations and embodiments are as examples only, and other suitable configurations and relations may be used to implement the invention.

While there have been shown and described what are at present considered to be the preferred embodiments of the invention, it will be apparent to those skilled in the art that various changes and modifications may be made herein without departing from the scope of the invention defined by the appended claims.

What is claimed is:

1. An electrodeless lamp to receive power from a radio frequency power source, comprising:
   (a) a conductive coupling probe having an axial extension from an input end to a radiant end,
   (b) a conductive outer conductor surrounding and offset from the coupling probe having at least a portion formed from a light transmissive, electrically conductive structure, and having (i) a sheath portion surrounding, and separated from the axial extension of the probe by a radial electrode gap, and (ii) a vessel portion surrounding the radiant end of the probe defining a re-entrant cavity around the radiant end, and having a cap axially separated from the radiant end by an axial electrode gap.

2. The electrodeless lamp of claim 1, wherein the axial extension of the sheath portion is less than the axial extension of the probe.

3. The electrodeless lamp of claim 1, wherein the radial electrode gap separation is less than the axial electrode gap separation.

4. The electrodeless lamp of claim 1, wherein the radial electrode gap separation is less than one quarter of the wave length for the frequency of the applied power.

5. The electrodeless lamp of claim 1, wherein the axial electrode gap separation is less than one quarter of the wave length for the frequency of the applied power.

6. The electrodeless lamp of claim 1, wherein the vessel portion of the outer conductor defining the re-entrant cavity is positioned radially from the probe end more than the axial electrode gap separation.

7. The electrodeless lamp of claim 6, wherein the vessel portion of the outer conductor defining the re-entrant cavity is positioned radially from the probe end more than twice the axial electrode gap separation.

8. The electrodeless lamp of claim 1, wherein the vessel portion of the outer conductor defining the re-entrant cavity includes an opening between the sheath portion, and the cap portion greater than the axial electrode gap separation.

9. The electrodeless lamp of claim 8, wherein the vessel portion of the outer conductor defining the re-entrant cavity includes an opening between the sheath portion, and the cap portion greater than twice the axial electrode gap separation.

10. The electrodeless lamp of claim 1, wherein the vessel portion of the outer conductor defining the re-entrant cavity encloses a re-entrant cavity volume greater than the volume of the axial electrode gap cavity positioned axially between the radiant end and cap portion.

11. The electrodeless lamp of claim 10, wherein the vessel portion of the outer conductor defining the re-entrant cavity encloses a re-entrant cavity volume greater than ten times the volume of the axial electrode gap cavity positioned axially between the radiant end and cap portion.

12. The electrodeless lamp in claim 1 wherein the probe has an axial extension less than one quarter of the wave length for the frequency of the applied power.

13. The electrodeless lamp in claim 1, wherein the sheath portion and vessel portion have sections that are coaxial and coextensive with a portion of the probe.

14. The electrodeless lamp in claim 1, wherein the sheath portion is coaxial and coextensive with a first portion of the probe and vessel portion is coaxial and coextensive with a remaining portion of the probe.

15. The electrodeless lamp in claim 1, wherein the sheath portion is substantially light transmissive.

16. The electrodeless lamp in claim 1, wherein the vessel portion is substantially light transmissive.

17. The electrodeless lamp in claim 1 wherein the outer conductor vessel portion defining the re-entrant cavity includes a tubular outer wall coaxial, and offset from the sheath portion to define a re-entrant volume partially positioned between the sheath and outer wall.

18. The electrodeless lamp in claim 1 wherein the outer conductor defining the re-entrant cavity includes a radial conductive coupling between the sheath adjacent the input end of the probe and vessel portion.

19. The electrodeless lamp in claim 1 wherein the outer conductor defining the re-entrant cavity includes a radial conductive coupling between the sheath adjacent the radiant end of the probe and vessel portion.

20. The electrodeless lamp in claim 1 wherein the outer conductor defining the re-entrant cavity comprises:
   (a) a tubular sheath coaxial, and offset from the coupling probe to define an inner volume between the coupling probe and the sheath;

(b) a tubular outer wall coaxial, and offset from the sheath to define a re-entrant volume between the inner and outer walls;

(c) a radial conductive coupling between input ends of the sheath and outer wall, and (d) a face piece transverse to and offset by an axial electrode gap from the radiant end of the coupling probe and the axial end of the sheath, closing the radiant end of the outer wall, and enclosing the coupling probe and sheath.

21. The electrodeless lamp in claim 1 wherein the containment vessel includes an wall with an phosphor coating on a side opposite from the excited gas.

* * * * *